United States Patent
Sandland

(10) Patent No.: US 10,735,792 B2
(45) Date of Patent: Aug. 4, 2020

(54) USING OCR TO DETECT CURRENTLY PLAYING TELEVISION PROGRAMS

(71) Applicant: GOOGLE LLC, Mountain View, CA (US)

(72) Inventor: Nathan Leslie Sandland, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 58 days.

(21) Appl. No.: 13/623,043

(22) Filed: Sep. 19, 2012

(65) Prior Publication Data

US 2014/0082646 A1    Mar. 20, 2014

(51) Int. Cl.
| | |
|---|---|
| H04N 21/258 | (2011.01) |
| H04N 21/44 | (2011.01) |
| H04N 21/4402 | (2011.01) |
| H04N 21/84 | (2011.01) |
| G06K 9/32 | (2006.01) |

(52) U.S. Cl.
CPC ......... *H04N 21/258* (2013.01); *G06K 9/3266* (2013.01); *H04N 21/44008* (2013.01); *H04N 21/440236* (2013.01); *H04N 21/84* (2013.01)

(58) Field of Classification Search
CPC ........... H04N 21/258; H04N 21/44008; H04N 21/440236; H04N 21/84
USPC .......................................................... 725/14
See application file for complete search history.

(56) References Cited

U.S. PATENT DOCUMENTS

| | | |
|---|---|---|
| 5,355,162 A | 10/1994 | Yazolino et al. |
| 6,658,662 B1 | 12/2003 | Nielsen |
| 6,742,183 B1 | 5/2004 | Reynolds et al. |
| 7,031,553 B2 | 4/2006 | Myers et al. |
| 7,113,230 B1 | 9/2006 | Genovese et al. |

(Continued)

FOREIGN PATENT DOCUMENTS

| | | |
|---|---|---|
| EP | 2464103 A2 | 6/2002 |
| EP | 2464103 A2 | 6/2012 |

OTHER PUBLICATIONS

Google Inc., International Search Report and Written Opinion, PCT/US2013/060697, dated Mar. 19, 2014, 14 pgs.

(Continued)

*Primary Examiner* — Nathan J Flynn
*Assistant Examiner* — Tung T Trinh
(74) *Attorney, Agent, or Firm* — Morgan, Lewis & Bockius LLP

(57) ABSTRACT

Features of various implementations are used to enable determining what a particular consumer is watching on television in order to deliver matched functionality, content and/or services, as a part of an interactive television suite of technologies. In some implementations, the process of determining what a particular consumer is watching is enabled so that communication between the primary set-top box and a supplemental set-top box and/or television integrated device is reduced, thereby avoiding the need for one or more provider specific APIs. For example, one aspect of the disclosure is a computer-implemented method of identifying a media program by capturing display data from the media program, and extracting text from the display data in response to determining that the display data includes the text overlay, wherein the extracted text is associated with the media program.

20 Claims, 6 Drawing Sheets

(56) References Cited

U.S. PATENT DOCUMENTS

| | | | |
|---|---|---|---|
| 7,134,131 B1 | 11/2006 | Hendricks et al. | |
| 7,620,268 B2 | 11/2009 | Myers et al. | |
| 7,664,317 B1* | 2/2010 | Sowerby | G06T 7/0002 |
| | | | 382/162 |
| 7,991,801 B2 | 8/2011 | Chen et al. | |
| 8,006,268 B2* | 8/2011 | Sloo | H04N 5/4401 |
| | | | 725/53 |
| 9,113,202 B1* | 8/2015 | Wiseman | H04L 7/08 |
| 2003/0004914 A1 | 1/2003 | McGreevy | |
| 2004/0075692 A1 | 4/2004 | Matichuk | |
| 2004/0183947 A1 | 9/2004 | Lee | |
| 2004/0201720 A1* | 10/2004 | Robins | H04N 1/00405 |
| | | | 348/222.1 |
| 2004/0239809 A1 | 12/2004 | Kim et al. | |
| 2004/0260621 A1 | 12/2004 | Foster et al. | |
| 2005/0020238 A1 | 1/2005 | Eastman et al. | |
| 2005/0123200 A1 | 6/2005 | Myers et al. | |
| 2005/0177847 A1 | 8/2005 | Konig et al. | |
| 2005/0201619 A1* | 9/2005 | Sun | G06K 9/3266 |
| | | | 382/176 |
| 2006/0026128 A1 | 2/2006 | Bier | |
| 2006/0265731 A1 | 11/2006 | Matsuda | |
| 2007/0073704 A1 | 3/2007 | Bowden et al. | |
| 2007/0186228 A1* | 8/2007 | Ramaswamy et al. | 725/14 |
| 2007/0192910 A1 | 8/2007 | Vu et al. | |
| 2008/0028424 A1 | 1/2008 | Cho | |
| 2008/0097984 A1 | 4/2008 | Candelore | |
| 2008/0098426 A1* | 4/2008 | Candelore | H04N 5/4403 |
| | | | 725/38 |
| 2008/0098432 A1 | 4/2008 | Hardacker et al. | |
| 2008/0098433 A1 | 4/2008 | Hardacker et al. | |
| 2008/0127253 A1 | 5/2008 | Zhang et al. | |
| 2008/0143880 A1* | 6/2008 | Jung | G06K 9/3266 |
| | | | 348/571 |
| 2008/0146277 A1 | 6/2008 | Anglin et al. | |
| 2008/0196075 A1* | 8/2008 | Candelore | 725/113 |
| 2008/0244637 A1* | 10/2008 | Candelore | H04N 7/163 |
| | | | 725/28 |
| 2008/0273114 A1* | 11/2008 | Hardacker | H04H 60/48 |
| | | | 348/468 |
| 2008/0279453 A1* | 11/2008 | Candelore | G03B 21/26 |
| | | | 382/176 |
| 2009/0077049 A1 | 3/2009 | Seet et al. | |
| 2009/0083801 A1 | 3/2009 | Hardacker et al. | |
| 2009/0205000 A1 | 8/2009 | Christensen et al. | |
| 2009/0320070 A1 | 12/2009 | Inoguchi | |
| 2009/0328237 A1* | 12/2009 | Rodriguez | H04N 21/8352 |
| | | | 726/32 |
| 2010/0008266 A1 | 1/2010 | Reda et al. | |
| 2010/0037264 A1 | 2/2010 | Hardacker et al. | |
| 2010/0123735 A1 | 5/2010 | Blanchard et al. | |
| 2010/0165207 A1* | 7/2010 | Deng | H04N 5/144 |
| | | | 348/620 |
| 2010/0192178 A1 | 7/2010 | Candelore | |
| 2010/0225830 A1 | 9/2010 | Blanchard et al. | |
| 2010/0296007 A1 | 11/2010 | Cooper | |
| 2011/0025842 A1* | 2/2011 | King | G06K 9/00442 |
| | | | 348/135 |
| 2011/0030016 A1 | 2/2011 | Pino, Jr. et al. | |
| 2011/0081948 A1 | 4/2011 | Shirai et al. | |
| 2011/0247044 A1 | 10/2011 | Jacoby | |
| 2011/0282906 A1 | 11/2011 | Wong | |
| 2011/0289532 A1 | 11/2011 | Yu et al. | |
| 2011/0311095 A1* | 12/2011 | Archer | G06K 9/00744 |
| | | | 382/100 |
| 2012/0079534 A1 | 3/2012 | Huang | |
| 2012/0143595 A1 | 6/2012 | Li et al. | |
| 2012/0210233 A1 | 8/2012 | Davis et al. | |
| 2013/0041921 A1 | 2/2013 | Cooper et al. | |
| 2013/0101002 A1 | 4/2013 | Gettings et al. | |
| 2013/0114849 A1 | 5/2013 | Pengelly et al. | |
| 2013/0120590 A1* | 5/2013 | Clark | H04N 17/004 |
| | | | 348/192 |
| 2013/0276029 A1 | 10/2013 | Li et al. | |

OTHER PUBLICATIONS

Google Inc., International Preliminary Report on Patentability, PCT/US2013/060697, dated Mar. 24, 2015, 10 pgs.

Google Inc., International Search Report and Written Opinion, PCT/US2015/017999, dated Jul. 6, 2015, 10 pgs.

Communication under rule 161/162 EPC, App. No. 15710665.9, dated Oct. 6, 2016, 2 pgs.

* cited by examiner

USING OCR TO DETECT CURRENTLY PLAYING TELEVISION PROGRAMS

TECHNICAL FIELD

The disclosed implementations relate generally to systems, methods and devices configured to collect information about a television program playing on a display.

BACKGROUND

Interactive television technologies enable adding internet-based functionality, content and/or services as an overlay to the television signals provided by cable and satellite television providers. For example, one of the aims of interactive television technologies is to deliver internet-based functionality, content and/or services to an individual consumer that are matched to a particular television program the consumer is currently watching. To that end, various interactive television technologies often need to determine what each consumer is watching in order to deliver matched functionality, content and/or services.

According to previously developed systems and methods, a second device, such as a supplemental set-top box, is configured to work with the primary set-top box provided by the cable or satellite television provider. In order to determine what a consumer is watching, the supplemental set-top box sends a query to the primary set-top box requesting information about the currently playing television program selected by the consumer (e.g. the title, names of actors or characters, electronic program guide information, etc.). In order to send such a query or otherwise communicate with the primary set-top box, the supplemental set-top box usually includes one or more provider-specific application program interfaces (APIs) that enable the supplemental set-top box to be paired with a wide variety of primary set-top boxes from various cable and satellite television providers. The development of each API requires the input and cooperation of a respective cable or satellite television provider that provides a primary set-top box to consumers. Developing the APIs with various providers tends to be inefficient, and hinders scaling such technologies across a wide variety of provider-specific platforms.

SUMMARY

Various implementations of systems, methods and devices within the scope of the appended claims each have several aspects, no single one of which is solely responsible for the attributes described herein. Without limiting the scope of the appended claims, some prominent features are described. After considering this disclosure, and particularly after considering the section entitled "Detailed Description" one will understand how the features of various implementations are used to enable determining in real time what a particular consumer is watching on television in order to deliver matched functionality, content and/or services, as a part of an interactive television suite of technologies.

One aspect of the disclosure is a computer-implemented method of identifying a media program by capturing display data from the media program as it is being presented; evaluating the display data to determine whether or not the display data includes a text overlay including information about the media program; and extracting text from the overlay in response to determining that the display data includes the text overlay, wherein the extracted text is associated with the media program.

Another aspect of the disclosure is a computer program product enabling identification of a playing broadcast media program by a device including a processor and a memory. In some implementations, the computer program product including instructions, storable in a non-transitory memory and executable by a processor, that, when executed by a processor, cause a device to capture display data provided by a set-top box; evaluate the display data to determine whether or not the display data includes a text overlay including information about the playing broadcast media program; and, extract text in response to determining that the display data includes said text overlay, wherein the extracted text identifies the playing broadcast media program.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1A:
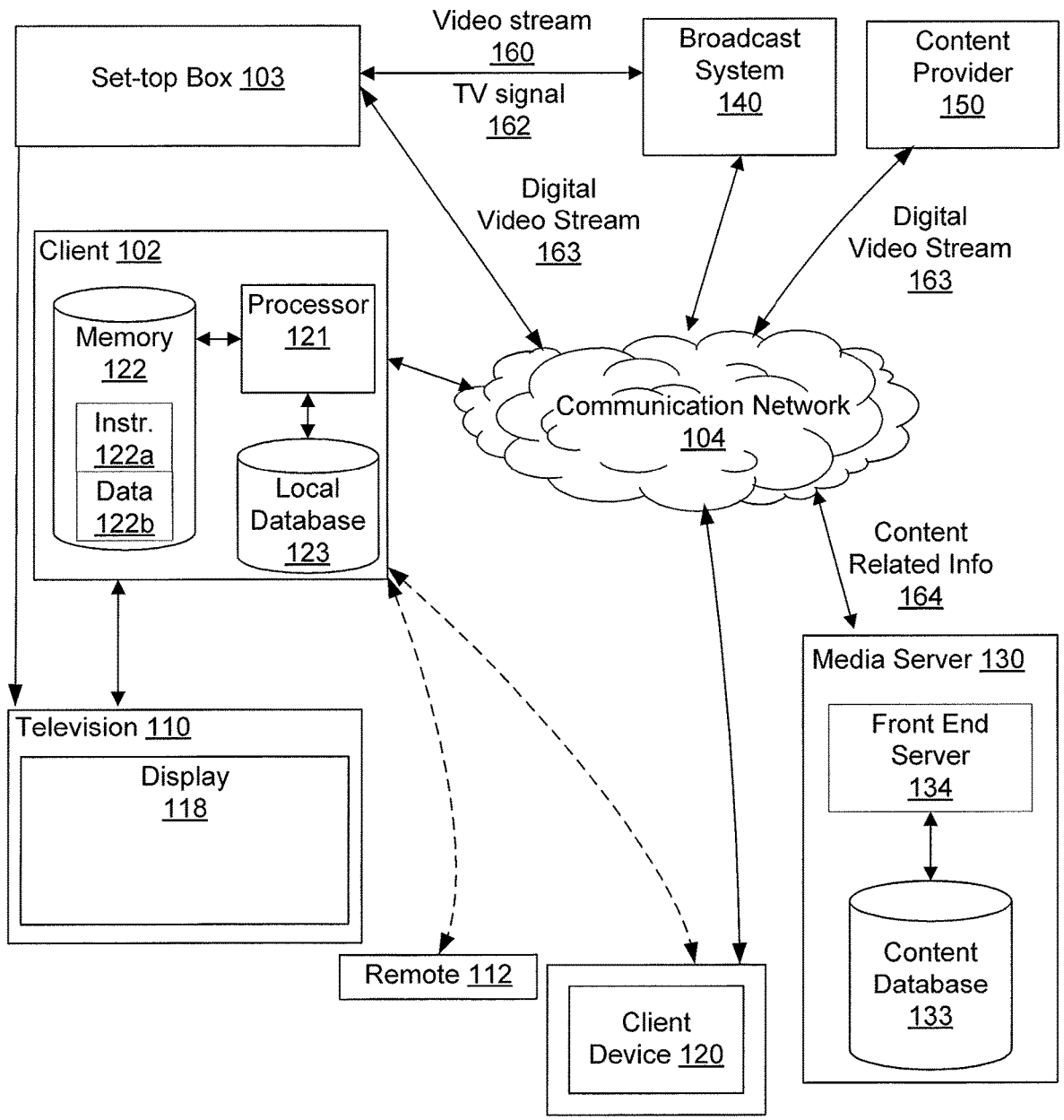
FIG. 1A is a diagram of an implementation of a client-server environment.

In accordance with common practice the various features illustrated in the drawings may not be drawn to scale. Accordingly, the dimensions of the various features may be arbitrarily expanded or reduced for clarity. In addition, the drawings may not depict all of the components of a given system, method or device; because, known methods, components, and circuits have not been described in exhaustive detail. Finally, like reference numerals may be used to denote like features throughout the specification and figures.

DETAILED DESCRIPTION

The various implementations described herein include systems, methods and/or devices that are enabled to determine what a particular consumer is watching on television in order to deliver matched functionality, content and/or services, as a part of an interactive television suite of technologies. In particular, in some implementations, the process of determining what a particular consumer is watching is enabled so that communication between the primary set-top box and a supplemental set-top box and/or television-integrated device is reduced, thereby avoiding the need for one or more provider specific APIs. For example, one aspect of the disclosure is a method of identifying a media program by capturing display data from the media program, and extracting text from the display data in response to determining that the display data includes the text overlay, wherein the extracted text is associated with the media program.

Numerous details are described herein in order to provide a thorough understanding of the example implementations illustrated in the accompanying drawings. However, the invention may be practiced without these specific details. And, well-known methods, procedures, components, and circuits have not been described in exhaustive detail so as not to unnecessarily obscure more pertinent aspects of the example implementations.

FIG. 1A is a diagram of an implementation of a client-server environment 100. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 100 includes a set-top box 103, a television (TV) 110, a client device 102 (e.g., a supplemental set-top box), a second screen client device 120 (e.g. a laptop, a tablet computer, smartphone, etc.), a remote control device 112, a communication network 104, a media server 130, a broadcast system 140, and a content provider 150. The second screen client device 120, the client device 102, the media server 130, the broadcast system 140, and the content provider 150 are capable of being connected to the communication network 104 in order to exchange information with one another and/or other devices and systems. The client-server environment 100 is merely an example provided to discuss more pertinent features of the present disclosure. Those skilled in the art will appreciate from the present disclosure that any number of such devices and/or systems may be provided in a client-server environment, and particular devices may be altogether absent.

In some implementations, the media server 130 is implemented as a single server system, while in other implementations it is implemented as a distributed system of multiple servers. Solely for convenience of explanation, the media server 130 is described below as being implemented on a single server system. Similarly, in some implementations, the broadcast system 140 is implemented as a single server system, while in other implementations it is implemented as a distributed system of multiple servers. Solely, for convenience of explanation, the broadcast system 140 is described below as being implemented on a single server system. Similarly, in some implementations, the content provider 150 is implemented as a single server system, while in other implementations it is implemented as a distributed system of multiple servers. Solely, for convenience of explanation, the content provider 150 is described below as being implemented on a single server system. Moreover, the functionality of the broadcast system 140 and the content provider 150 can be combined into a single server system. Additionally and/or alternatively, while only one broadcast system and only one content provider is illustrated in FIG. 1A for the sake of brevity, those skilled in the art will appreciate from the present disclosure that fewer or more of each may be present in an implementation of a client-server environment.

In some implementations, the second screen client device 120 (e.g. a tablet computer or laptop, etc.), the set-top box 103, the TV 110, the client device 102, and a remote control 112 are provided in combination within, for example, a home or commercial establishment. The set-top box 103 is configured to receive and decode signals including media content from the broadcast system 140 or the like. In operation, the set-top box 103 decodes the signal received from the broadcast system 140 or the like and provides audio and video content to the TV 110 for display. While a TV has been used in the illustrated example, those skilled in the art will appreciate from the present disclosure that any number of displays devices, including computers, laptop computers, tablet computers, smart-phones and the like, can be used to display a video stream and play the associated audio stream. Additionally and/or alternatively, in some implementations the functions of the set-top box 103 and the TV 110 are combined into a single device.

In operation, the remote control 112 may be used to control the operation of one or more of the set-top box 103, the TV 110, and the client device 102. In one mode of operation, the client device 102 monitors the display 118 of the TV 110 to determine when a program information overlay is provided. In another mode of operation, the client device 102 emulates the function of the remote control device 112 to prompt the set-top box 103 to display the program information overlay. And in yet another mode of operation, the client device 102 receives IR transmissions from the remote control 112 that are directed to the set-top box 103. In turn, the client device 103 may then communicate with any one of the media monitoring server 130, the broadcast system 140, and the content provider 150 through the communication network 104. More specific details pertaining to how the client device 102 acquires real time program information related to what a particular user is watching is described below with reference to FIGS. 3-5.

In some implementations, the set-top box 103 is any computer device capable of connecting to the communication network 104, receiving video streams 160, extracting information from video streams 160 and presenting video streams for the display using the TV 110 (or another display device). In some implementations, the set-top box 103 is configured as a receiver for cable TV and/or satellite TV, a digital video recorder (DVR), a digital media receiver, a TV tuner, a computer, and/or any other device that outputs TV signals. In some implementations, the TV 110 is a conventional TV display that is not connectable to the Internet and that displays digital and/or analog TV content received via over the air broadcasts or a satellite or cable connection.

Similarly, in some implementations the client device 102 is any computer device capable of connecting to the communication network 104 and the TV 110. As described below with reference to FIG. 5, in some implementations, the client device 102 is capable of receiving infrared (IR) transmissions directed to the set-top box 103 from the remote control device 112. Additionally and/or alternatively, in some implementations, the client device 102 is capable of wired and/or wireless communication with the client device 120. In some implementations, the client device 102 includes one or more processors 121, non-volatile memory 122 such as a hard disk drive, and a local database 123. In some implementations, the memory 122 includes application instructions 122a and associated data 122b. As discussed in greater detail below, the processor 121 executes the one or more applications in accordance with a set of instructions received from the media monitoring server 130. The client device 102 may also have input devices such as a keyboard, a mouse and/or track-pad (not shown). In some implementations, the client device 102 includes a touch screen display, a digital camera and/or any number of supplemental devices to add functionality.

As is typical of televisions, the TV 110 includes a display 118 and speakers. Additionally and/or alternatively, the TV 110 can be replaced with another type of display device for presenting video content to a user, such as for example, a computer, a tablet device, a mobile telephone, a projector, or other type of video display system. The display device can be coupled to the set-top box 103 via a wireless or wired connection.

As used herein, a TV signal is an electrical, optical, or other type of data transmitting medium that includes audio and/or video components corresponding to a TV channel. In some implementations, the TV signal is a terrestrial over-the-air TV broadcast signal or a sign distributed/broadcast on a cable-system or a satellite system. In some implementations, the TV signal is transmitted as data over a network connection. For example, the set-top box 103 can receive video streams 160 from an Internet connection. Audio and video components of a TV signal are sometimes referred to herein as audio signals and video signals. In some implementations, a TV signal corresponds to a TV channel that is being displayed on the TV 110.

Figure 1B:
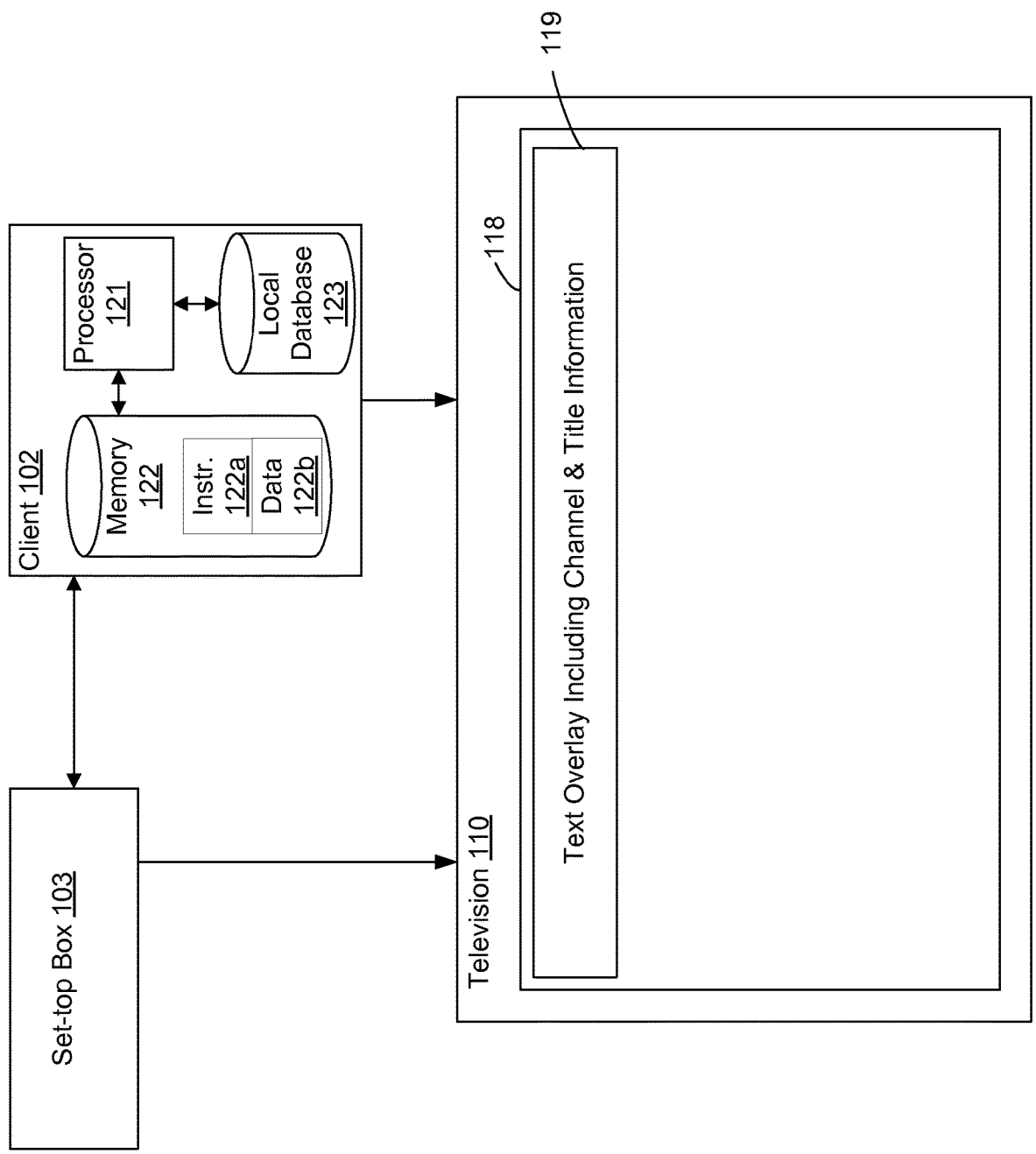
FIG. 1B is a diagram of a portion of the client-server environment including an example schematic screen display on a television.

FIG. 1B is a diagram of a portion of the client-server environment 100 including an example schematic screen display on the TV 110. Again, the TV 110 includes the display 118 on which video of a media program is displayed. Further, while the video is being displayed, the set-top box 103 may provide a text overlay 119 that includes channel and title information. For example, the text overlay 119 typically includes the channel the media program is being presented on, as well as the title of the media program. The text overlay 119 also often includes information about actors, characters, and/or a synopsis of the media program.

With further reference to FIG. 1A, the second screen client device 120 may be any computer device that is capable of connecting to the communication network 104, such as a computer, a laptop computer, a tablet device, a netbook, an Internet kiosk, a personal digital assistant, a mobile phone, a gaming device, or any other device that is capable of communicating with the media server 130.

The communication network 104 may be any combination of wired and wireless local area network (LAN) and/or wide area network (WAN), such as an intranet, an extranet, including a portion of the Internet, or a wireless network provided by a wireless carrier. It is sufficient that the communication network 104 provides communication capability between the second screen client device 120 and the media monitoring server 130. In some implementations, the communication network 104 uses the HyperText Transport Protocol (HTTP) to transport information using the Transmission Control Protocol/Internet Protocol (TCP/IP). HTTP permits the client device 102 to access various resources available via the communication network 104. However, the various implementations described herein are not limited to the use of any particular protocol.

In some implementations, the media monitoring server 130 includes a front end server 134 that facilitates communication between the media monitoring server 130 and the communication network 104. The front end server 134 receives content information from the client device 102. As described in greater detail below, in some implementations, the content information includes program information, such as the program title, actor names, character names, plot summaries, etc. In some implementations, the front end server 134 is configured to send a set of instructions to the client device 102. In some implementations, the front end server 134 is configured to send content files, links to content files and/or metadata associated with the content files. The term "content file" includes any document or content of any format including, but not limited to, a video file, an image file, a music file, a web page, an email message, an SMS message, a content feed, an advertisement, a coupon, a playlist or an XML document. In some implementations, the front end server 134 is configured to send or receive one or more video streams. In some implementations, the front end server 134 is configured to receive content directly from the broadcast system 140 and/or the content provider 150 over the communication network 104.

In some implementations, the media monitoring server 130 includes a content database 133. In some implementations, the content database 136 includes advertisements, videos, images, music, web pages, email messages, SMS messages, content feeds, advertisements, coupons, playlists, XML documents, and ratings associated with various media content or any combination thereof. In some implementations, the content database 136 includes links to advertisements, videos, images, music, web pages, email messages, SMS messages, content feeds, advertisements, coupons, playlists, XML documents and ratings associated with various media content. In some implementations, the content database 133 is a distributed database.

In some implementations, the broadcast system 140 includes media content such as TV programs. In some implementations, the broadcast system 140 also includes metadata associated with one or more of the TV programs, and application program interface instructions. In some implementations, the application program interface instructions include instructions that can be provided to a client device and/or may be executed by the broadcast system 140 under a client-server model or the like in order to link a particular TV program with the associated metadata and/or link the TV program and the associated metadata 142 with external data and/or services, such as a social networking application. Similarly, in some implementations, the content provider 150 additionally and/or alternatively includes media content such as TV programs, as well as metadata associated with one or more of the TV programs.

Figure 2:
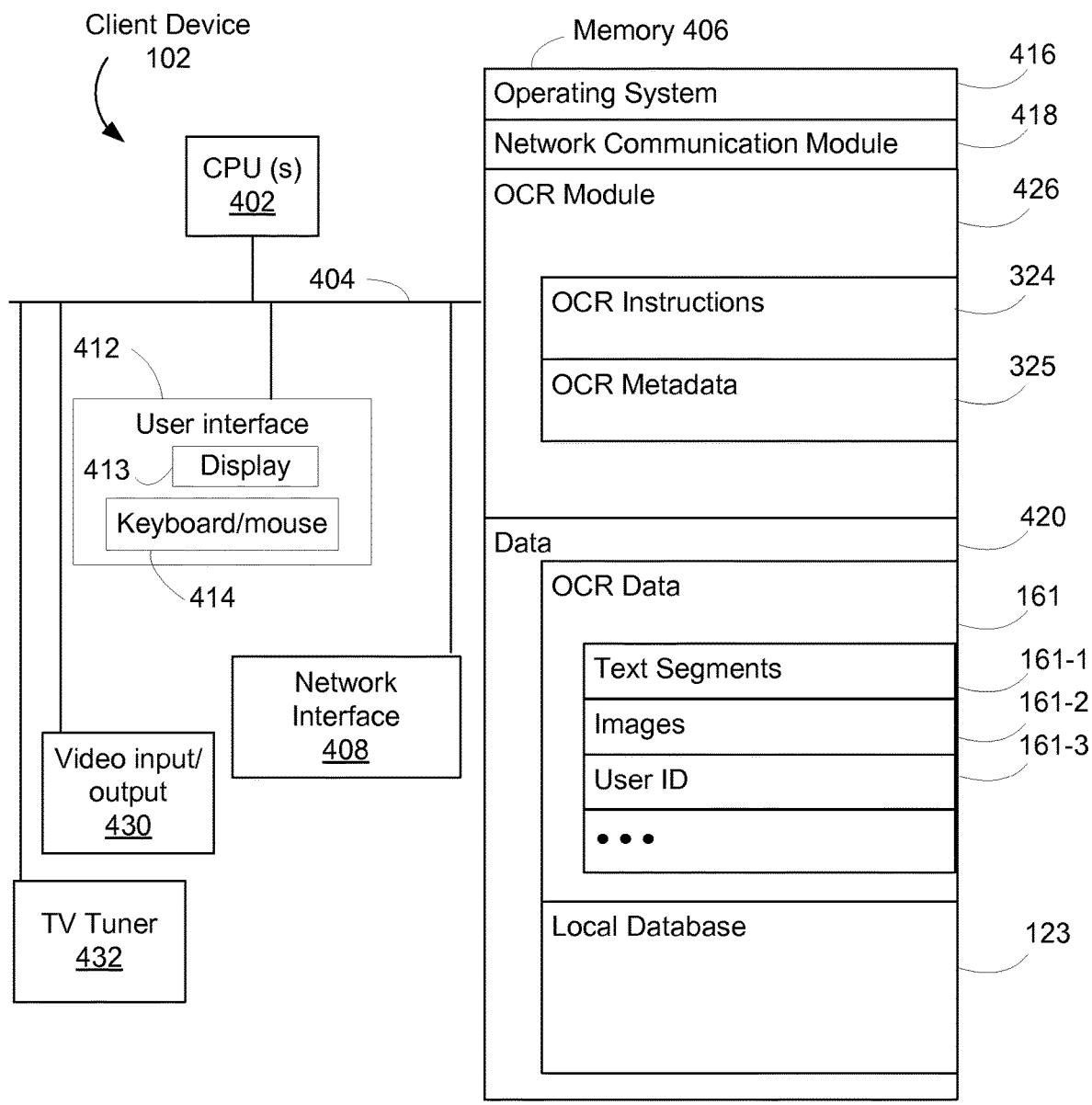
FIG. 2 is a diagram of an example implementation of a client device operable as a supplemental set-top box and/or a television-integrated device.

FIG. 2 is a diagram of an example implementation of the client device 102, discussed above with reference to FIG. 1A, and which may be operable as a supplemental set-top box and/or a television-integrated device. While certain specific features are illustrated, those skilled in the art will appreciate from the present disclosure that various other features have not been illustrated for the sake of brevity and so as not to obscure more pertinent aspects of the implementations disclosed herein. To that end, the client device 102 includes one or more processing units (CPU's) 402, one or more network or other communications interfaces 408, memory 406, a TV tuner 432, a video I/O 430, and one or more communication buses 404, for interconnecting these and various other components. The communication buses 404 optionally include circuitry (sometimes called a chipset) that interconnects and controls communications between system components. The client device 102 may also include a user interface 412 comprising a display device 413 and a keyboard and/or mouse (or other pointing device) 414 and/or a remote control (etc.). Memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402. Memory 406, or alternatively the non-volatile memory device(s) within memory 406, comprises a non-transitory computer readable storage medium. In some implementations, memory 406 or the computer readable storage medium of memory 406 store the following programs, modules and data structures, or a subset thereof including operation system 416, network communication module 418, an OCR module 426 and data 420.

The operating system 416 includes procedures for handling various basic system services and for performing hardware dependent tasks.

The network communication module 418 facilitates communication with other devices via the one or more communication network interfaces 404 (wired or wireless) and one or more communication networks, such as the Internet, other wide area networks, local area networks, metropolitan area networks, and so on.

In some implementations, the OCR module 426 enables the client device 102 to process screen shots (e.g. images from the TV 110) to obtain the program information included in the program information overlay provided by the primary set-top box 103. To that end, the OCR module 426 includes OCR instructions 324 and metadata 325.

In some implementations, the data module 420 includes OCR data 161 and a local database 123 of program information. In some implementations, the program information is received from a broadcast system and/or content provider. In some implementations, the OCR data 161 includes text segments 161-1, images 161-2 and user ID information 161-3.

Each of the above identified elements may be stored in one or more of the previously mentioned memory devices, and each of the modules or programs corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various implementations. In some implementations, memory 406 stores a subset of the modules and data structures identified above. Furthermore, memory 406 may store additional modules and data structures not described above.

Figure 3:
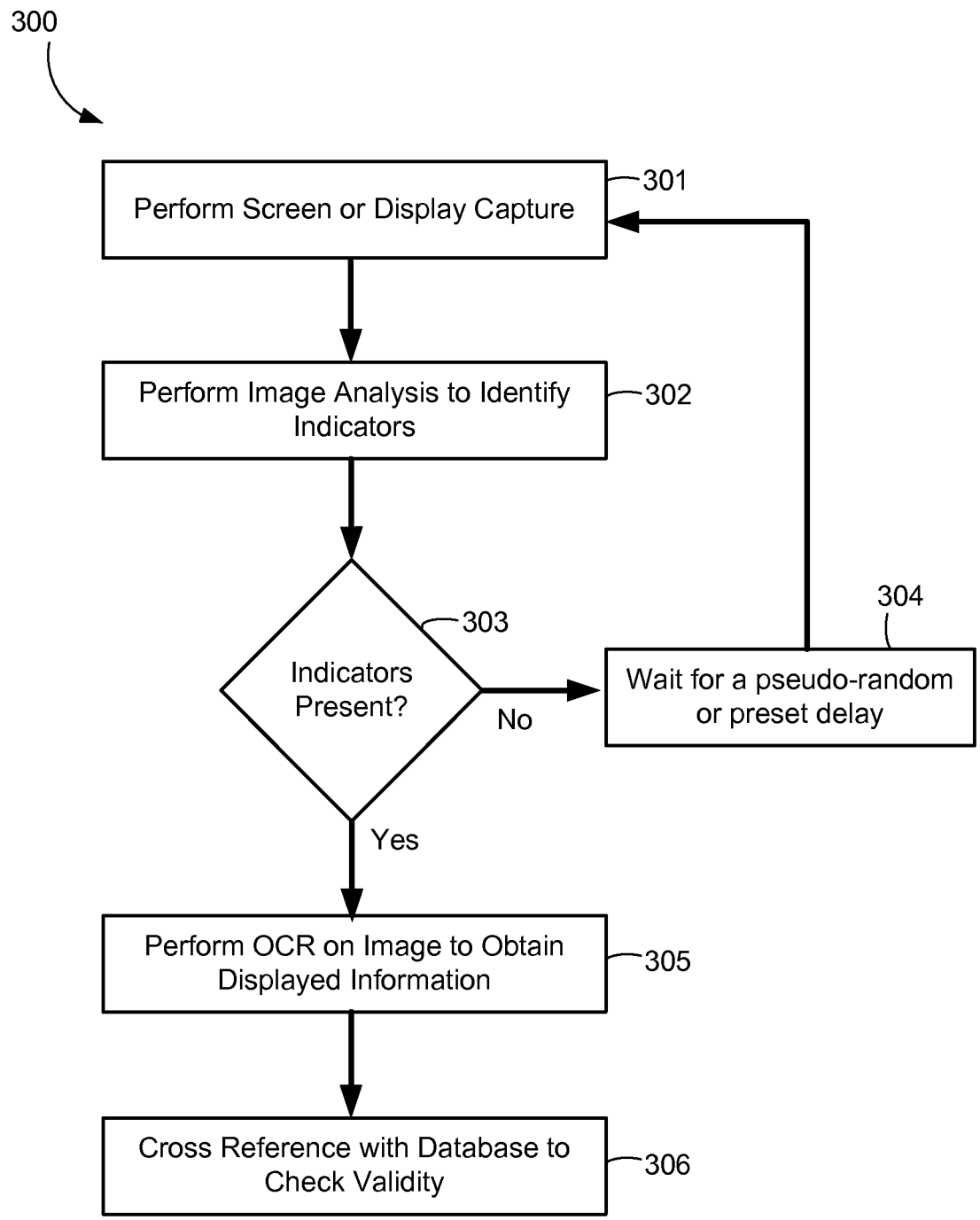
FIG. 3 is a flowchart representation of an implementation of a method of determining what a consumer is currently watching.

FIG. 3 is a flowchart representation of an implementation of a method 300 of determining what a consumer is currently watching. In some implementations, the method is performed by a device, such as a supplemental set-top box and/or a television integrated module, in order to enable determining what a consumer is currently watching. For example, with reference to FIG. 1A, in some implementations, the method 300 is performed by the client device 102 (i.e., the supplemental set-top box). As noted above, when a user changes the channel or requests program information by, for example, using one or more channel selection options or pressing an "INFO" button, the primary set-top box displays an overlay including program information, such as the current channel, the title of the playing program and information about the program. Accordingly, the method includes identifying instances during which the primary set-top box provides the overlay by monitoring the display output provided by the primary set-top box, and parsing the overlay for the desired information. Additionally and/or alternatively, in some implementations, the method includes detecting when channel identifiers are displayed without being prompted by user interaction (i.e., a user pressing a button)

To that end, the method includes performing a screen or display data capture from the display device that is displaying the television program selected by the consumer through a primary set-top box or the like in order acquire an image of what is being displayed (301). In some implementations, the screen capture data is obtained from the video signal provided by the primary set-top box. Additionally and/or alternatively, in some implementations, the screen capture data is obtained from a display (i.e., video) card included in the set-top box and/or the operating system of the set-top box. Additionally and/or alternatively, the screen capture data is obtained from a TV app running on at least one of the primary set-top box, the supplemental set-top box, the TV, and a second screen device. Additionally and/or alternatively, in some implementations, the supplemental set-top box (or the like) includes a camera operable to capture an image of the display of a television or the like. The method includes analyzing the image to identify whether the image includes indicators that an overlay is being displayed by the primary set-top box (302). For example, in some implementations, the indicators include the color of the overlay, the percentage of display area the overlay typically covers when visible, the arrangement of text with the overlay, contrast between a portion of the display likely to be displaying the program and another portion of the display likely to be displaying the overlay.

The method includes determining whether one or more of the indicators are present as indicated by the image analysis (303). If none of the indicators are present for a particular screen capture ("No" path from 303), the method includes waiting a pseudo-random amount of time or a preset delay time (304) before capturing another screen shot or the like. On the other hand, if at least one indicator is present or another threshold number of the indicators is present ("Yes" path from 303), the method includes applying an optical character recognition technique to the image in order to identify and extract the displayed information (305). Having extracted the title and/or program information, the method includes cross-referencing the extracted information with a local and/or remote database to ensure the validity of the information (306). For example, with further reference to FIG. 1A, the client device 102 may communicate with the media server 130 in order to check the validity of the extracted display information. More specifically, the client device 102 may transmit all or a portion of the extracted information to the media server 130. In turn, the media server 130 may then check the extracted information against a content database (e.g., the content database 133, FIG. 1) to ensure that the extracted data is correct and/or provide corrected information to the client device 102 when the extracted data is incorrect but can be matched to database information.

Figure 4:
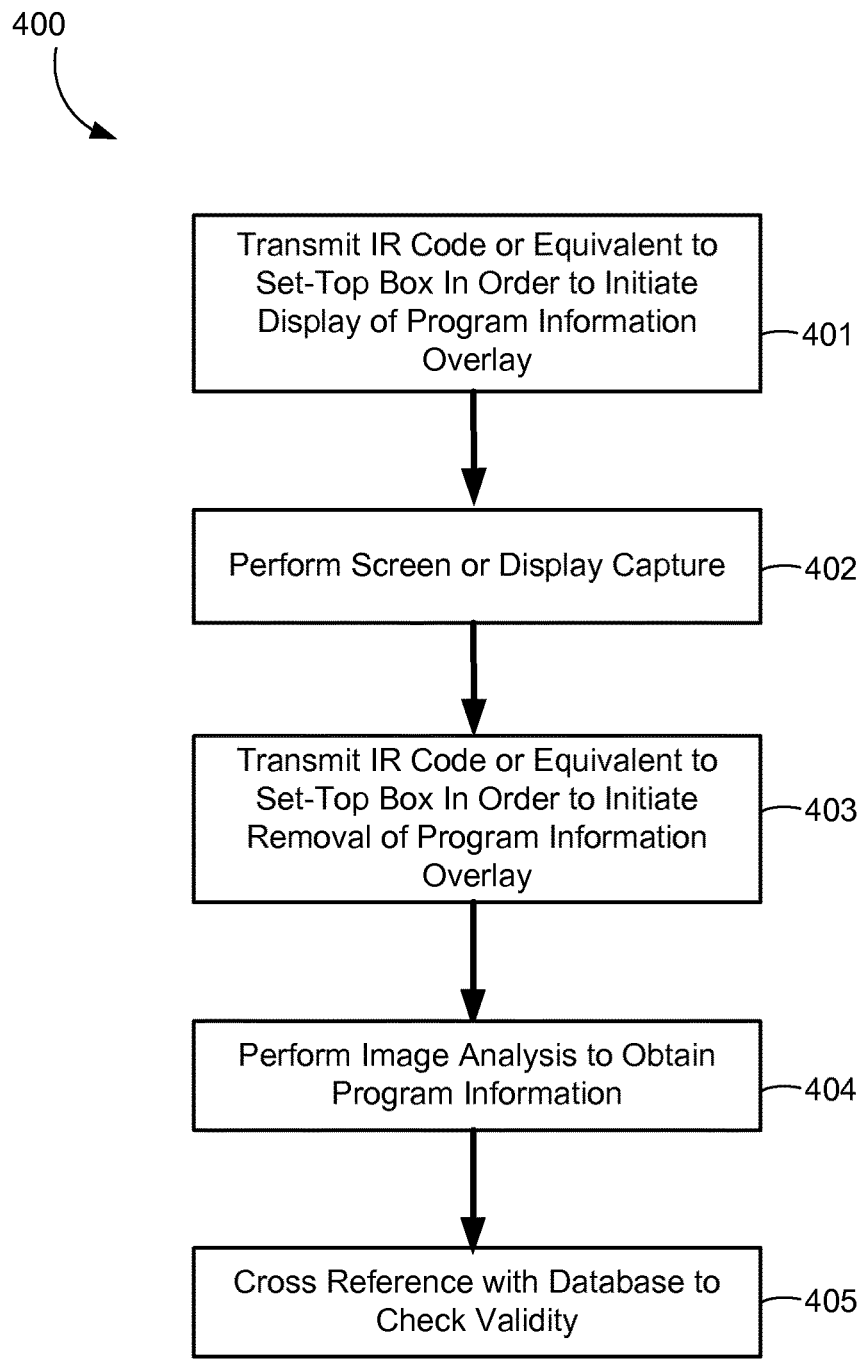
FIG. 4 is a flowchart representation of an implementation of a method of determining what a consumer is currently watching.

FIG. 4 is a flowchart representation of an implementation of a method 400 of determining what a consumer is currently watching. In some implementations, the method is performed by a device, such as a supplemental set-top box and/or a television integrated module, in order to enable determining what a consumer is currently watching by, in part, emulating the operation of a remote control device associated with the primary set-top box. To that end, the method includes transmitting a first infrared (IR) code (or the like) to the primary set-top box in order to initiate the display of the program information overlay (401). For example, with further reference to FIG. 1A, one of the client device 102 and the client device 120 may transmit an IR code to the set-top box 103.

The method then includes performing a screen capture to acquire a screen shot (i.e. image) including the program information overlay (402). Having acquired the screen shot, the method includes transmitting a second IR code (or the like) to the primary set-top box in order to initiate the removal of the program information overlay on the playing television program (403). The method includes analyzing the image or screen shot to obtain the program information presented in the overlay (404). Having extracted the title and/or program information, the method includes cross-referencing the extracted information with a local and/or remote database 133 to ensure the validity of the information (405).

Figure 5:
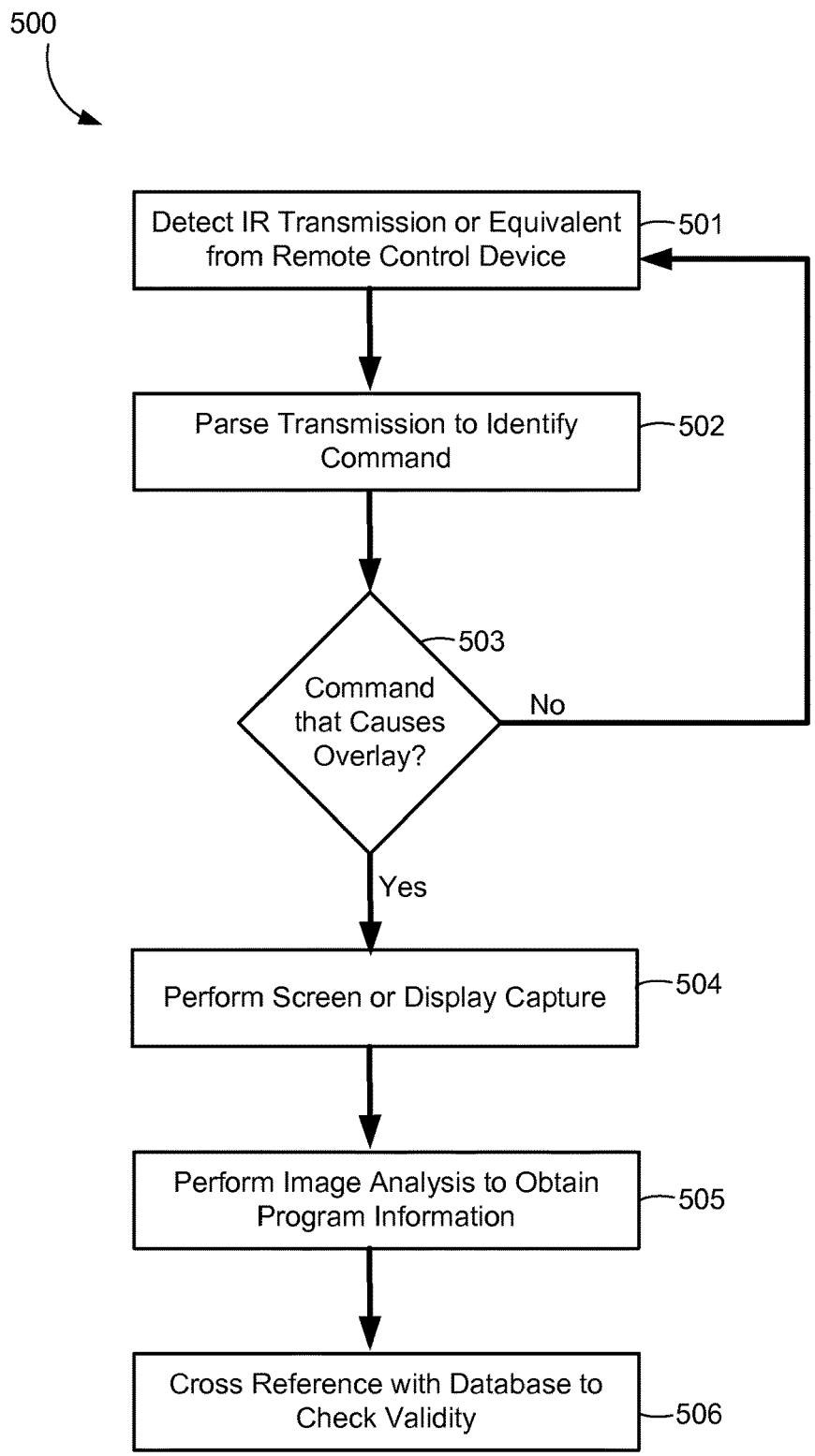
FIG. 5 is a flowchart representation of an implementation of a method of determining what a consumer is currently watching.

FIG. 5 is a flowchart representation of an implementation of a method 500 of determining what a consumer is currently watching. In some implementations, the method is performed by a device, such as a supplemental set-top box and/or a television integrated module, in order to enable determining what a consumer is currently watching, by detecting IR transmission from a remote control device associated with the primary set-top box. For example, with further reference to FIG. 1A, the client device 102 may detect IR transmissions directed to the primary set-top box 103 from the remote control device 120.

To that end, the method includes detecting an IR transmission or equivalent from a remote control device associated with a primary set-top box (501). In turn, the method includes parsing the transmission in order to identify the command that is represented by the IR transmission (502). Having identified the command, the method includes determining whether or not the identified command causes the primary set-top box to provide the program information overlay in the video stream provided to the display device. If the detected command is not likely to cause the primary set-top box to provide the program information overlay ("No" path from 503), the method includes circling back to detect another IR transmission. On the other hand, if the detected command is likely to cause the primary set-top box to provide the program information overlay ("Yes" path from 503), the method includes performing a screen or display data capture from the display device that is displaying the television program selected by the consumer through a primary set-top box or the like in order acquire an image of what is being displayed (504). The method includes analyzing the image or screen shot to obtain the program information presented in the overlay (505). And, the method includes cross-referencing the extracted information with a local and/or remote database to ensure the validity of the information (506).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of identifying a media program, comprising:
   at a first electronic device coupled to a display device displaying the media program, the first electronic device including a processor and memory:
      without issuing a command to the display:
         capturing an image of display data from the media program;
         evaluating the image to determine whether or not the display data includes a portion with a text overlay with information about the media program, including evaluating one or more of:
            a color of the portion;
            a percentage of the image covered by the portion;
            an arrangement of text within the portion; and
            a contrast between the portion and the media program;
         in accordance with a determination that the display data does not include the text overlay, initiating a delay period;
         at the end of the delay period and without being prompted by user interaction, repeating the capturing and the evaluating;
         in accordance with a determination that the display data does include the text overlay, extracting text from the text overlay; and
         obtaining the identity of the media program based on the extracted text.

2. The method of claim 1, wherein capturing the display data includes performing a screen capture from the display device.

3. The method of claim 1, wherein capturing the display data includes decoding data transmitted by a second electronic device to the display device.

4. The method of claim 1, further comprising comparing the extracted text to electronic program guide data to confirm identification of the playing media program.

5. The method of claim 1, further comprising:
   detecting, without initiating, a remote control signal directed at a second electronic device that has access to the display data, wherein the remote control signal causes the display data to be displayed on a display device associated with the second electronic device; and in response to detecting the remote control signal, capturing display data from the media program.

6. The method of claim 1, further comprising detecting a control signal directed at a second electronic device that has access to the display data;
wherein the control signal is generated by a mobile device configured to communicate with both the first electronic device and the second electronic device;
wherein the control signal causes the display data to be displayed on the display; and
wherein capturing display data from the media program comprises capturing the display data in response to detecting the control signal.

7. The method of claim 1, further comprising verifying the identity of the media program by comparing the extracted text with data from a database.

8. The method of claim 7, wherein the first electronic device includes the database.

9. The method of claim 1, wherein the first electronic device comprises a mobile device, and wherein capturing display data from the media program comprises capturing display data via a TV app on the first electronic device.

10. The method of claim 1, wherein capturing display data from the media program comprises capturing display data via a camera on the first electronic device.

11. A computer program product enabling identification of a playing broadcast media program by a first electronic device including a processor and a memory, the computer program product including instructions, stored in a non-transitory memory and executable by a processor, which when executed by a processor, cause the first electronic device to:
without issuing a command to a display device displaying display data:
capture an image of display data from the media program;
evaluate the image to determine whether or not the display data includes a portion with a text overlay with information about the media program, including evaluating one or more of:
a color of the portion;
a percentage of the image covered by the portion;
an arrangement of text within the portion; and
a contrast between the portion and the media program;
in accordance with a determination that the display data does not include the text overlay, initiate a delay period;
at the end of the delay period and without being prompted by user interaction, repeat the capturing and the evaluating;
in accordance with a determination that the display data does include the text overlay; and
obtain the identity of the media program based on the extracted text.

12. The computer program product of claim 11, wherein capturing the display data includes performing a screen capture from the display device.

13. The computer program product of claim 11, wherein capturing the display data includes decoding data transmitted by a second electronic device to the display device.

14. The computer program product of claim 11, wherein the one or more programs further include instructions to: compare the extracted text to electronic program guide data to confirm identification of the playing broadcast media program.

15. The computer program product of claim 11, wherein the one or more programs comprise instructions, which when executed by the processor, cause the first electronic device to:
detect, without initiating, a remote control signal directed at a second electronic device that has access to the display data, wherein the remote control signal causes the display data to be displayed on a display device associated with the second electronic device; and
in response to detecting the remote control signal, capture display data from the media program.

16. A first electronic device, comprising:
a processor and
memory for storing one or more programs, wherein the one or more programs comprise instructions, which when executed by the processor, cause the first electronic device to:
without issuing a command to a display device displaying display data:
capture an image of display data from a media program;
evaluate the image to determine whether or not the display data includes a portion with a text overlay with information about the media program, including evaluating one or more of:
a color of the portion;
a percentage of the image covered by the portion;
an arrangement of text within the portion; and
a contrast between the portion and the media program;
in accordance with a determination that the display data does not include the text overlay, initiate a delay period;
at the end of the delay period and without being prompted by user interaction, repeat the capturing and the evaluating;
in accordance with a determination that the display data does include the text overlay; and
obtain the identity of the media program based on the extracted text.

17. The first electronic device of claim 16, wherein capturing the display data includes performing a screen capture from the display device.

18. The first electronic device of claim 16, wherein capturing the display data includes decoding data transmitted by a second electronic device to the display device.

19. The first electronic device of claim 16, wherein the one or more programs further comprise instructions to: compare the extracted text to electronic program guide data to confirm identification of the playing media program.

20. The first electronic device of claim 16, wherein the one or more programs further comprise instructions to:
detect, without initiating, a remote control signal directed at a second electronic device that has access to the display data, wherein the remote control signal causes the display data to be displayed on a display device associated with the second electronic device; and
in response to detecting the remote control signal, capture display data from the media program.

* * * * *